July 5, 1932.  E. F. W. ALEXANDERSON  1,866,338
PICTURE TRANSMISSION APPARATUS
Filed April 23, 1930

Inventor:
Ernst F. W. Alexanderson,
by Charles  M. Tullar
His Attorney.

Patented July 5, 1932

1,866,338

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

PICTURE TRANSMISSION APPARATUS

Application filed April 23, 1930. Serial No. 446,724.

My invention relates to apparatus for the transmission of pictures and it has for its object the provision of improved apparatus by which such advantages as greater speed, detail and brilliance may be obtained.

In accordance with my invention the picture to be transmitted is scanned simultaneously by a plurality of light beams each of which is pulsating in character and each of which has a pulsation frequency which is different from that of the others. Light reflected from the picture by the several moving light spots is received by one or more photo-electric devices, the output of which is a combination of all the frequencies of the plurality of light beams employed, each modulated in accordance with the shades of those portions of the picture traversed by the respective beams. The several current frequencies are segregated by suitable means examples of which are well known, and the segregated frequencies are transmitted by wire or radio to the receiving station. Here the several frequencies are caused to control a like number of light beams which in a manner corresponding to the arrangement of the scanning light beams at the transmitting station cooperate to project the transmitted image.

My invention will be better understood from the following description taken in connection with the accompanying drawing, and its scope will be pointed out in the appended claims.

Figure 1:
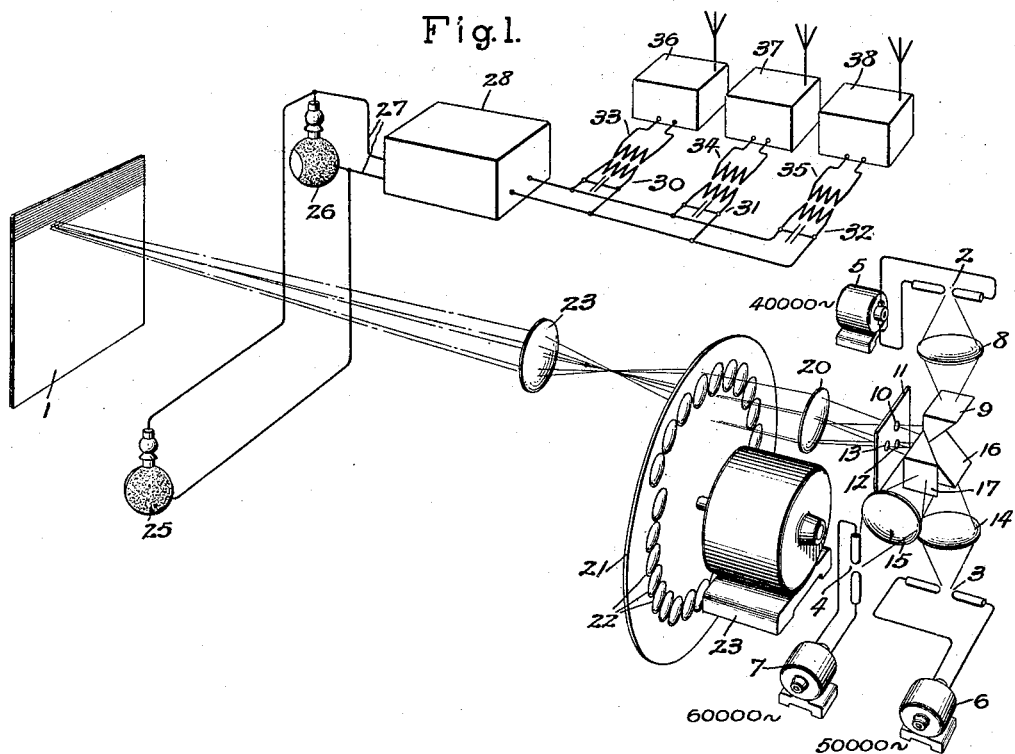
Figure 2:
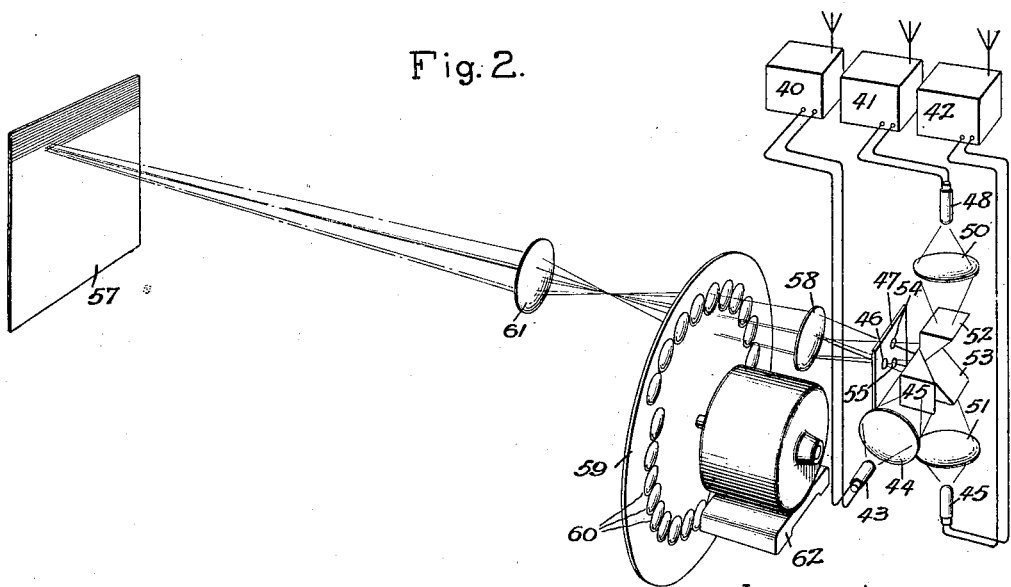

Referring to the drawing which illustrates one embodiment of my invention, Fig. 1 shows that part of the apparatus by which the pictures are sent, and Fig. 2 shows the part by which the transmitted pictures may be received.

In Fig. 1 of the drawing, the picture 1 which is to be transmitted, is scanned simultaneously by a plurality of pulsating light beams, three in the present case, having different frequencies of pulsation. The sources of these light beams are shown, for example, as the three arc lamps 2, 3 and 4, fed from the A. C. generators, 5, 6 and 7 respectively. The frequencies of these generators should remain constant during the transmission of a picture and may, for example, have values respectively of 40,000 cycles, 50,000 cycles and 60,000 cycles per second. Light from the arc lamp 2 is collected and brought to a focal point in the usual manner by a lens shown at 8 and by suitable means, such for example as the prism 9, is reflected on the opening 10 in the diaphragm 11, which diaphragm is arranged at the focal point of the light beam. This diaphragm is provided also with two other similar openings 12 and 13 which in the drawing are shown arranged in the form of a trangle on which openings the light from the respective lamps 3 and 4 is focused and reflected by the use of lenses 14 and 15 and prisms 16 and 17 respectively. The three openings 10, 12 and 13 in the diaphragm 11 become in effect three light sources. Between the diaphragm 11 and the picture 1 to be transmitted, I provide any well known means for causing the images of three openings 10, 12 and 13 to simultaneously scan the picture. Such a means is illustrated as comprising the collecting lens 20, the lens disk 21 in which is mounted a spiral series of lenses 22 and the objective 23. Lens disk 21 is shown mounted on the shaft of the motor 23 whereby it is rotated at a uniform speed.

The light reflected from the three images or spots of light which scan the picture is received by the photoelectric cells 25 and 26, the amount of light reflected from each spot being governed by the shade of that portion of the picture traversed by the spot, and the frequency of the light pulsation of each spot being controlled by the frequency of the current supplying the lamp from which the light originates. The output circuit 27 of the cells 25 and 26 therefore carries current which is a combination of three different frequencies, the amplitude of each of which is constantly varied in accordance with the varying shades of the picture being transmitted. Output circuit 27 connects with a suitable amplifying device 28 whereby the feeble current from the cells is amplified to a suitable value. The output side of the amplifier 28 connects with suitable means for segregating the several current frequencies. Such means is represented in the drawing as comprising the three filter circuits 30, 31 and 32, each shown as comprising a combination of inductance and capacitance tuned to pass currents of the desired frequency. Inductively related to these tuned circuits are the circuits 33, 34 and 35 respectively, which connect with the radio transmitting devices 36, 37 and 38 respectively, each shown having an antenna by which the segregated signals may be transmitted by radio on separate wave lengths.

In Fig. 2 where I have shown apparatus for receiving the signals transmitted from the sending station illustrated by Fig. 1, are three radio receivers 40, 41 and 42, each having its own antenna and tuned to receive only signals from the transmitters 36, 37 and 38 respectively. Connected with the output side of receiver 40 is the discharge lamp 43, light from which is collected and focused by the lens 44 and is reflected by the prism 45 to opening 46 in diaphragm 47. This arrangement, it will be noted, is similar to that described above as forming a part of the sending station. In the same manner lamps 48 and 49 connect with the receivers 41 and 42 respectively, and have their light collected and focused by the lenses 50 and 51, and reflected by the prisms 52 and 53 on the openings 54 and 55 in diaphragm 47. As in the sending station, the diaphragm 47 is arranged in the focal point of the light from the several lamps and again the three openings in the diaphragm constitute in effect three light sources. By means of apparatus similar to that described above, an image of each of the openings 46, 54 and 55 is caused simultaneously to scan the screen 57. This apparatus comprises the collecting lens 58, the lens disk 59 having the spiral series of lenses therein 60 and the objective 61. The lens disk 59 is shown mounted on the shaft of motor 62 which by well known means, not shown, is driven at synchronous speed with the motor 23 of the sending station. The three light spots on the screen 57 resulting from the projection of the light passing the three openings 46, 54 and 55 of diaphragm 47, vary in intensity in accordance with the light reflected from the three spots which scan the picture 1. By this means therefore the picture to be transmitted is simultaneously scanned by a plurality of light beams, the resulting plurality of signals is transmitted in separate radio channels and the received picture is projected by a like number of light beams controlled respectively by the signals received in the several radio channels.

As a result of scanning the picture with a plurality of light beams instead of by a single beam, I am able to increase greatly the brilliancy of the reproduced picture which increase as pointed out in my Patent No. 1,694,301, December 4, 1928, may be approximately as the square of the number of light beams employed. Instead of thus increasing the brilliancy of the picture, I may with the same scanning apparatus increase the detail of the picture by focusing the several beams to smaller spots such that the total area of all of the spots shall substantially equal the area of the single spot heretofore used, thus producing in effect a picture which has a number of lines per inch which is a multiple of that otherwise obtained. Moreover various other advantages may be obtained such, for example, as the use of a lens disk having only a fraction of the number of lenses mounted therein, thus reducing the cost of the apparatus.

What I claim as new and desire to secure by Letters Patent of the United States, is:—

1. In picture transmitting apparatus, a plurality of pulsating light sources having frequencies differing from one another, a scanning disk having a plurality of light openings and means for projecting on the picture the light from all of said sources simultaneously through each of said openings.

2. In picture transmitting apparatus, a plurality of pulsating light sources having frequencies differing from one another, a scanning disk including a series of lenses through each of which passes the light from all of said pulsating sources and optical means cooperating with said lenses for imaging on the picture all of said sources simultaneously through each successive lens of the scanning disk.

3. In picture transmitting apparatus, a plurality of electric lamps, means for supplying to the respective lamps currents having frequencies which differ from one another, a plate having a plurality of apertures upon which the light from the respective lamps is directed, a scanning disk having a spiral series of lenses through each of which passes the light from all of said apparatus and lenses arranged on opposite sides of the disk adapted to cooperate with each successive disk lens to focus on the picture the light simultaneously from all of said apertures.

4. Picture transmission apparatus comprising a plurality of alternating current generators whose currents differ in frequency, an arc lamp connected with each generator, a screen having a plurality of openings therein, means comprising a lens and a prism for focusing on said openings light from the respective lamps, means including a rotatable lens disk for imaging each of said openings on the picture to be transmitted and for scanning the picture with said images, a photo-electric cell, an amplifier connected therewith, a plurality of signal transmitting devices, and means comprising filtering devices for delivering impulses of a single frequency from said amplifier to each of said transmitting devices.

In witness whereof, I have hereunto set my hand this 22nd day of April, 1930.

ERNST F. W. ALEXANDERSON.

CERTIFICATE OF CORRECTION.

Patent No. 1,866,338.   July 5, 1932.

ERNST F. W. ALEXANDERSON.

It is hereby certified that error appears in the printed specification of the above numbered patent requiring correction as follows: Page 2, line 119, claim 3, for "apparatus" read apertures; and that the said Letters Patent should be read with this correction therein that the same may conform to the record of the case in the Patent Office.

Signed and sealed this 25th day of October, A. D. 1932.

(Seal)

M. J. Moore,
Acting Commissioner of Patents.